UNITED STATES PATENT OFFICE.

WALTER VOIGTLÄNDER-TETZNER, OF LUDWIGSHAFEN, GERMANY, ASSIGNOR TO BADISCHE ANILIN & SODA FABRIK, OF SAME PLACE.

BLUE DISAZO DYE.

SPECIFICATION forming part of Letters Patent No. 682,510, dated September 10, 1901.

Application filed June 19, 1901. Serial No. 65,175. (No specimens.)

*To all whom it may concern:*

Be it known that I, WALTER VOIGTLÄNDER-TETZNER, a doctor of philosophy and a chemist, a subject of the King of Saxony, residing at Ludwigshafen-on-the-Rhine, in the Kingdom of Bavaria, Germany, have invented new and useful Improvements in Disazo Coloring-Matter, of which the following is a specification.

I have discovered that 2-phenyl-amido-5-naphthol-7-sulfoacid (hereinafter termed "phenyl-I-acid") is a valuable component for the production of substantive azo dyes, and both symmetrical and mixed dyes containing this component can be readily prepared.

In this application for Letters Patent I wish to claim the mixed azo coloring matter which can be obtained by the combination of one molecular proportion of tetrazotised dianisidin with one molecular proportion of phenyl-I-acid and one molecular proportion of 1.8 amido-naphthol-alpha-sulfoacid.

Phenyl-I-acid (the production of which I do not claim) can be prepared as follows:—

The parts are by weight.

Mix together about one hundred and twenty (120) parts of 2.5-dihydroxy-naphthalene-7-sulfoacid, five hundred (500) parts of a solution of ammonium sulfite (containing about forty per cent of $(NH_4)_2SO_3$ and eighty (80) parts of anilin. Stir the mixture thoroughly and heat it on the water bath until the dihydroxy acid has disappeared, or nearly so, and, in its place, the phenyl-amido-naphthol sulfoacid has been formed. This is but slightly soluble in cold dilute mineral acids, so that it separates out on taking test portions, cooling and acidifying. To work up the reaction product add sufficient carbonate of soda to make it alkaline, distil off the excess of anilin with steam, acidify the alkaline solution with hydrochloric acid, allow the solution to cool, and collect the acid formed by filtering and washing. It can be purified by recrystallization.

The following example will serve to illustrate the nature of my invention, but the invention is not confined to the example given, nor to the conditions therein described. The parts are by weight.

Example: Convert two hundred and forty four (244) parts of dianisidin into the tetrazo compound in the known manner, and run the tetrazo solution thus obtained into a well cooled solution of three hundred and sixteen (316) parts of phenyl-I-acid in six thousand (6,000) parts of water and such an excess of soda that the reaction liquid remains alkaline the whole time. Keep cool with ice. As soon as the formation of the intermediate product is ended, introduce the solution or suspension thereof, into a solution of two hundred and forty (240) parts of 1.8 amido-naphthol-5-sulfoacid in two thousand (2,000) parts of water and one hundred and ten (110) parts of calcined soda. Salt out the mixed coloring matter formed with common salt.

In place of 1.8 amido-naphthol-5-sulfoacid in the above example, 1.8 amido-naphthol-4-sulfoacid can be employed.

My new coloring matter thus obtained, and whose composition can be expressed by the formula:—

$$\text{Dianisidin} \begin{cases} \text{Phenyl-I-acid} \\ \text{Amido-naphthol-alpha-sulfoacid} \end{cases}$$

is soluble in water with a blue color, to which solution the addition of hydrochloric acid, or caustic soda lye, produces a violet-blue to blue-violet precipitate. In concentrated sulfuric acid (containing about ninety six per cent of $H_2SO_4$) it dissolves with a blue-green color and on reduction with zinc and dilute caustic soda lye yields a brown-red vat. The coloring matter dyes unmordanted cotton pure blue shades.

Now what I claim is—

The new coloring matter obtainable by combining tetrazotised dianisidin with phenyl-I-acid and 1.8 amido-naphthol-alpha-sulfoacid, which dissolves in water with a blue color, to which solution the addition of hydrochloric acid or caustic soda lye, produces a violet-blue, to blue-violet, precipitate; which dissolves in concentrated sulfuric acid with a blue-green color, and yields on reduction with zinc and dilute caustic soda lye a brown-red vat, substantially as described.

In testimony whereof I have hereunto set my hand in the presence of two subscribing witnesses.

WALTER VOIGTLÄNDER-TETZNER.

Witnesses:
JOHN L. HEINKE,
JACOB ADRIAN.